United States Patent

[11] 3,602,162

[72] Inventor Steele D. Williams
18 N. Seminole Drive, Chattanooga, Tenn. 37411
[21] Appl. No. 820,135
[22] Filed Apr. 29, 1969
[45] Patented Aug. 31, 1971

[54] TRASH AND GARBAGE DISPOSAL APPARATUS INCLUDING MOBILE UNIT
10 Claims, 11 Drawing Figs.

[52] U.S. Cl. ................................................. 110/8 R
[51] Int. Cl. .................................................. F23g 5/02
[50] Field of Search ......................................... 71/14; 110/8, 8 A, 18; 261/5, 6

[56] References Cited
UNITED STATES PATENTS

| | | | |
|---|---|---|---|
| 2,802,543 | 8/1957 | Clark | 261/5 |
| 2,961,977 | 11/1960 | Coleman | 110/8 |
| 3,031,981 | 5/1962 | Smauder | 110/8 |
| 3,357,380 | 12/1967 | Siracusa | 110/8 |
| 3,482,533 | 12/1969 | Ankersen | 110/8 |
| 3,507,232 | 4/1970 | Ankersen | 110/8 |

*Primary Examiner*—Kenneth W. Sprague
*Attorney*—Julius E. Foster

ABSTRACT: This invention relates to a trash and garbage disposal apparatus and method. The apparatus may be stationary, for treatment of disposal material brought to such apparatus, or the apparatus may be mobile to be truck mounted and to operate on trash and garbage as collected, and while in transit. In either case, the garbage, and trash, as combustible material, are fed into a continuously operating furnace, where they are burned. Any resulting ash is accumulated. The products of combustion, from the burning operation of the garbage are picked up and entrained in a stream of air through this furnace and they are then fed into an aqueous filter solution, in which those products of combustion are absorbed, and recovered, and the clean air freed to go back into the atmosphere.

Quantities of the saturated filter solution may be periodically withdrawn and mixed in with quantities of accumulated ash, or alternatively, the resulting saturated solution is periodically dried into cake, which is added to and mixed with the accumulated ash. The mixture, by either method, is then sacked, as a soil nutrient mix, later to be sold to nurseries, farmers and other users of fertilizer. This filter solution exemplified herein, is an alkaline solution.

Glass bottles, tin cans and metal, as noncombustibles, are conveyed to a set of twin crushing rollers where the glass is crushed and broken and dropped into a receiving bin, while the tin cans and metal are flattened and delivered to a transport system, which may include a magnetic unit for separation. The tin cans are then discharged into an automatic press and compressed into bales. Before being compressed and baled, the tin cans will have been passed through a flame furnace to burn off any labels or adhering food particles, and the products of combustion recovered as previously explained.

PATENTED AUG 31 1971

STEELE D. WILLIAMS
INVENTOR

BY
ATTORNEY

STEELE D. WILLIAMS
*INVENTOR*

TRASH AND GARBAGE DISPOSAL APPARATUS INCLUDING MOBILE UNIT

This invention relates to a trash and garbage disposal method and apparatus which may be constructed and arranged to serve as a stationary apparatus or as a mobile unit for treating trash and garbage in transit as collected.

One of the most serious problems confronting people all over the world is the disposal of trash and garbage. In the United States, the methods now used are causing air and water pollution, and, by use of land dumps, are using thousands of acres of valuable land needed for other purposes, and which are creating health hazards by breeding rats.

The present invention is directed to apparatus and to procedure for treating garbage and trash in a manner that avoids air and water pollution, and that does not destroy the usefulness of large ground acreage, and that does not attract and stimulate the breeding of rats and vermin.

The present invention does incinerate garbage and trash, but does so with novel apparatus and process, which recovers the ingredients in the fumes or products of combustion, and accumulates any residue ash, and treats them in combination to make those ingredients available for use as soil nutrients. The herein method of recovery of the ingredients from the products of combustion prevents pollution of the ambient atmosphere, such as now results from conventional burning or incineration.

In the invention herein, the matter to be incinerated is fed into a furnace and burned with a high-temperature flame. The gaseous products of combustion are filtered to remove and recover oxidation products and undesirable air pollutants. For that operation, a stream of air is passed through the furnace to entrain the gaseous products of combustion and any unburned, free floating particles, and the airstream and contents is then directed and forced through an aqueous alkaline solution which traps and filters out those oxidation products and free particles, and releases the cleansed air to the ambient atmosphere.

Where the operation indicates the need for further cleansing of the air released from the filter bath, the air may be further treated by transmission through a second similar bath, or through other type of filter, in sequence operations.

The noncombustible products are collected as residue ash, or as glass and metal accumulations.

The bath solution, or batches of the solution, may be periodically removed and treated, by drying, with or without heat, to recover the solution residue, after evaporation of moisture. Such solution residue contains recovered byproducts of combustion, and is mixed with the residue ash for subsequent use as soil nutrient materials.

Where the trash content includes noncombustibles, such as bottles and cans, the bottles are crushed and the broken glass collected for appropriate washing and cleaning and thus reclaimed as "cullet," a commercial byproduct for use in glass-making furnaces.

The tin cans are fire cleaned to remove labels and adhering food particles, and then accumulated in successive weighted batches, and then compressed into small bales for convenient subsequent handling.

The invention herein is shown in two modifications.

In one modification, the garbage and the trash are externally separated and then separately introduced into the apparatus, and separately processed through the apparatus, but with common fume-collecting and filtering equipment.

In a second modification, the garbage and the trash are all introduced together in one place and processed through the furnace and burning operation to separate the combustibles and the noncombustibles, and the products then separately treated.

In the first modification, the garbage and trash are shredded and air-mixed for optimum combustion; then fed into a high-temperature flame furnace, from which the gaseous products are collected and filtered, as previously mentioned, while the residue ash is collected and later mixed with the filtered residue for later use as soil nutrients. At the same time, the glass bottles and tin cans are separately treated; the glass bottles are crushed and the broken glass collected for subsequent washing and use as "cullet," and the tin cans are appropriately burned to clean off the adhering paper labels, adhering food particles and other covering films, and then the cans are collected and compressed into bales for convenient handling.

In the second modification, the garbage and the trash, including the bottles and tin cans, are first subjected to a coarse primary crusher, which cracks the bottles, partially compresses the tin cans, and shreds the garbage. Everything is then fed into the furnace for burning. The combustibles go out as gaseous fumes and products of combustion. A grate in the furnace pivotally opens to dump any broken glass, the bottles and tin cans, and residue ash from the combustibles, onto a shaker screen, which passes the residue ash and conveys the broken glass, the bottles and the tin cans to a conveyor to a pair of breakup rolls. There the glass and the bottles are further broken into small pieces and dropped into a cullet basket, while the tin cans are led to a baling compressor, where the cans are weighed and compressed into sequential bales for easier handling.

In both modifications, the gaseous byproducts permit recovery of soil nutrients from the garbage, and the collected glass provides a source of "cullet," and the tin cans are made available for processing for metal recovery. In the meantime, all such treatment and processing of the garbage and trash has been accomplished without polluting the atmosphere, and without providing food supply attractions for rats and vermin.

The apparatus and the method disclosed herein may, naturally, be employed for a stationary installation.

A special feature of this invention is that the apparatus may be mounted on a truck for mobility.

One object of this invention is to provide a method of and an apparatus for disposing of garbage and trash, that will eliminate those problems and hazards of recent conventional garbage disposal procedures.

Another object of this invention is to provide a method of and an apparatus for treating garbage and trash to recover as much as possible of the ingredients for reuse as soil nutrients.

Another object of this invention is to provide a trash and garbage collection and disposal apparatus and method of operation that will permit operation on a mobile truck, and that would eliminate the necessity of hauling refuse to a centralized location, for burying, or for burning in a conventional incinerator, the operation of which is a health hazard and contributes to air pollution.

Another object of this invention is to provide a unit for collecting trash and garbage, that is, mobile, and that is equipped to incinerate the combustible elements of collected trash and garbage, and that serves to filter out and trap gaseous products of combustion that would be air pollutants if freely released; and that serves to conserve such products of combustion for reuse as soil nutrients; and that, in the course of such operation, operates to separate out noncombustible elements into metal and nonmetal collections for separate and different kinds of subsequent treatment for disposal.

Another object of this invention is to provide a mobile unit for the purpose of collecting and treating trash and garbage, and which transports sufficient fuel in an approved tank to service the needs of required burners and the operations of engines of sufficient capacity to operate all mechanical components for treating the trash and garbage in such mobile unit.

Another object of this invention is to provide a mobile trash and garbage collection unit in which the combustible material in the garbage or trash is burned in a specially designed combustion chamber by the heat blast from a burner in which a suitable fuel such as kerosene, gasoline or propane may be used, and any resulting ash residue accumulated for other use. The same fuel in a similar burner may be used to preliminarily burn the labels, coating and food particles from tin cans, where they are separately treated, after which they are pressed into bales.

An advantageous feature of my invention is that all fuel supply lines to the burners can be closed when the heat blast in not required, thereby conserving fuel consumption.

Another object of my invention is to provide a means and method of eliminating air pollution such as is caused by conventional methods of burning trash and garbage at local dumps or by using incinerators.

Another object of my invention is to prevent further contribution to the trash and garbage dumps which are breeding places for rats and other vermin, which are carriers of disease and impair the health of the neighboring populace.

Another object of my invention is to provide mobile means for collecting trash and garbage in populated areas of cities, town and counties in a manner which requires fewer employees than the method now in use. This will also result in greatly reducing the initial investment in trash and garbage collection trucks, as fewer trucks will be needed.

A further object of my invention is to provide a mobile means of collecting trash and garbage from door to door, and immediately burning the combustible material while en route, absorbing the fumes therefrom in an aqueous solution, mixing the dried sludge therefrom with the ashes from the burned trash and garbage, automatically weighing and sacking this mixture, and sealing the sacks. This material is beneficial as fertilizer in promoting growth to plants, grass and produce.

In the operation of the system of the herein described method of using such a mobile trash garbage collection unit, it is understood that the sacked ashes, the crushed glass, and the baled tin cans, will have to be removed from the mobile unit periodically, which may be sufficient if done at the end of the daily operation, or which may be done more frequently, if necessary.

Other objects and advantages of my invention will become apparent, and the construction of the apparatus and the manner of operation of both modifications will be more fully explained in, and better understood from, the following description taken together with the accompanying drawings, in which:

FIG. 1–A is a schematic view of the input port ring, with the airstream curtain.

The equipment involved herein for treating garbage and trash may, of course, be readily disposed in a stationary installation. A particular feature and advantage of this invention is that the equipment can be arranged and combined as mobile equipment in a housing for disposition on a truck, within the practical dimensional limits of current conventional sanitation trucks.

Figure 1:
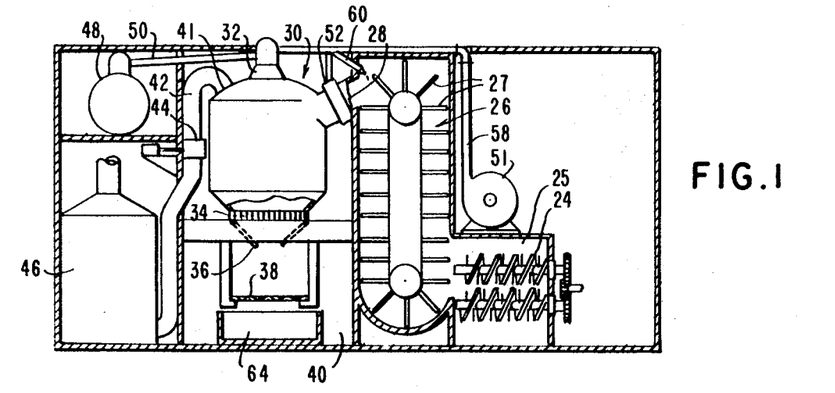
FIG. 1 is a schematic longitudinal elevational view of one side of the unit, right-hand as viewed from the rear, with outside panel removed, showing the equipment components used, from front to rear, in the processing and reduction of trash and garbage by burning and recovering the products of combustion.
Figure 2:
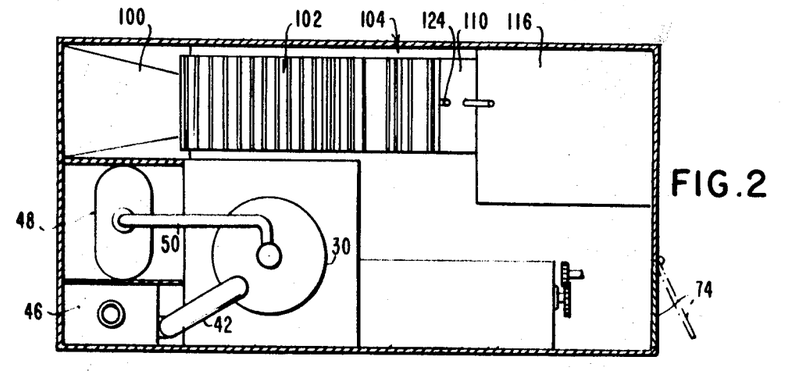
FIG. 2 is a composite and schematic top view, with the roof removed from the housing of a mobile disposal unit, showing the location of the various pieces of equipment as components in the assembly and used in the operation of one modification of a mobile trash and garbage disposal unit which embodies this invention.
Figure 3:
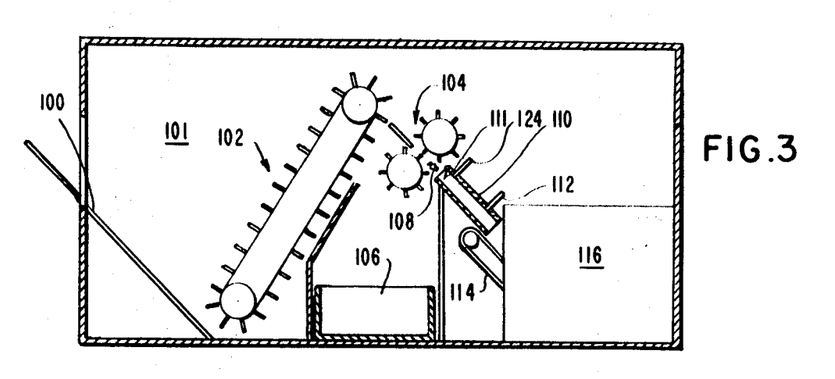
FIG. 3 is a schematic longitudinal elevational view, generally along line 2–3 of FIG. 2, and shows the components along the left-hand side of the unit considered from the rear, showing the various components of the equipment for performing the sequential steps in the processing of glass bottles and tin cans.
Figures 4, 5, 6:
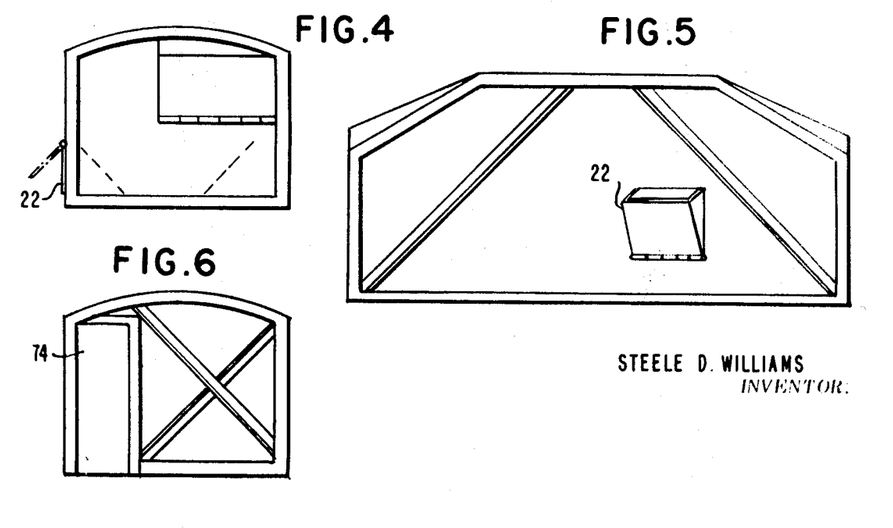
FIG. 4 is a schematic rear view of the unit housing, showing the locations of hinged doors covering openings for a large scrap bin, for a fuel tank, and for a dump space for receiving bottles and tin cans as they are collected from door to door.
FIG. 5 is an elevational view of the right-hand side of the outer panel of the housing showing the hinged chute which receives the trash and garbage as it is collected from door to door and fed to a mobile machine for processing.
FIG. 6 is a front end elevational view of the outer panel of the housing, showing a hinged door of sufficient size to permit each piece of equipment to be moved into the housing of the unit, where it can be properly installed. The door opening also provides easy access to all equipment for inspection and maintenance, and for removing the sacked ashes and the baled tin cans from the interior of the housing.

Considering the housing structure, for the present, to be removed to expose the equipment, as shown schematically and functionally in FIGS. 1, 2 and 3, the equipment for the treatment of garbage and combustible trash is first considered. In FIG. 5, a hinged charging chute 22 is shown in open position, ready to receive garbage or trash. FIG. 1 then shows the view with the panel of FIG. 5 removed to expose the mechanism and operating components for treating the garbage or trash introduced through the charging chute 22 of FIG. 5.

For the present, for the first modification of the invention, it will be considered that all refuse to be collected and treated by the mobile unit will have been separated into two classifications, first, a collection of combustible garbage and trash; and, second, a collection of bottles and tin cans and the like; while other large items such as discarded furniture, can be carried away on platforms over the wheels at both ends of the collection truck. In the second modification, the garbage and bottles and cans are handled without prior separation.

The disposal equipment of this invention, in the first modification, is intended for handling articles in the first two of those classifications, namely, garbage and combustible trash in one grouping, and bottles and tin cans in a second grouping.

The manner in which the garbage and combustible trash is handled in the apparatus herein will now be considered first.

For convenience, and simplicity of reference, the garbage and combustible trash material will all be referred to in this following description as garbage.

When collected garbage is dumped into the chute 22, shown in FIG. 5, the action proceeds as shown in FIG. 1. The garbage drops down onto a pair of cooperating shredding rolls 24, whose function is to shred the garbage and combustibles into reduced and comminuted pieces, loosely packed with commingled air, so they will be more fully and completely accessible to a burning flame, and so that such shredded and comminuted material can be entirely burned by an applied flame without the generation of black noxious fumes such as result from the failure of access of sufficient oxygen to permit proper and complete burning.

The function of the shredding roll structure 24, in addition to shredding the garbage material, is to move the shredded garbage forward axially along the space in the roller compartment 25, to a path where the garbage will be picked up by shelves or blades 27 of the vertical conveyor 26, which serves to raise the garbage from the lower region to an elevated region from which the garbage may be directed and fed into and through an inlet port 28 of the flametype furnace 30, in which the garbage and other included combustible materials will be burned. A top burner 32 directs a gas flame down onto the pile of garbage, which falls from the input port 28 by gravity down into the pit of the furnace and onto grate bars 34 where the garbage is supported until burned. Unburned residue ash from the garbage is then permitted to fall through two under doors 36 onto a shaker screen 38. The shaker screen 38 serves to sift the ash to permit the ash to fall as a loose powder into a suitable container in lower compartment 40, and such screen also serves as a vibrating conveyor to move pieces of noncombustible material to the outer end of the shaker screen for removal after accumulation.

Gravity alone may be relied on to feed the garbage into the furnace. A feature of this operation, however, is to utilize an airstream for one function as a propelling medium for the garbage. The airstream is also utilized as a source of oxygen, and also serves as a carrier for the fumes or products of combustion to remove the fumes from the furnace. By distributing the incoming airstream over the area of the inlet port, the fumes generated in the furnace are prevented from moving outward through said inlet port 28.

To further assure that none of the fumes will exit through the inlet port 28, a separate air curtain is shown provided by means of an inlet port ring 52 provided with perforations 54 directed radially inward, partially axially inward, as indicated by the arrow 56, to provide an inward pressure area at inlet port 28.

This arrangement provides a carefree structure for the inlet port, and freer movement for the garbage than a pivoted closure door over the inlet port would permit.

In order to prevent the fumes as generated by the burning garbage, from polluting the atmosphere, the fumes are entrained in the input airstream and are drawn out from the furnace 30 through an outlet port 41 and conduit 42 by an exhaust blower 44, indicated schematically, and then the airstream and fumes are directed through the continuing conduit 42 into an aqueous alkaline bath 46, in which the pollutant ingredients in the entrained fumes of the products of combustion are absorbed in the bath and the stream of cleaned air is permitted to percolate out through the bath into the atmosphere.

Gas for the burning flame is carried in a tank 48 and is fed to the burner 32 at the top of the furnace 30 through a pipe 50, under pressure. The gas is mixed with a stream of air from a blower 51. The exhaust draft created by the exhaust blower 44 in the exhaust conduit 42 will be made sufficient to create a draft gradient from any furnace opening, this including particularly the inlet port 28 and the grate structure, toward the exhaust outlet 42, that will insure against unwanted and undesirable seepage of the fumes out of the furnace 30 into the atmosphere.

The air pressure for the inlet ring 52 at the inlet port 28 may be provided through a conduit 58, connected to a blower 51 that also supplies the air pressure for the airstream into and through the furnace, and also supplies the gas from the main tank 48 to the flame burner 32 at the top of the furnace 30.

The same source of air pressure from blower 51 and its connecting conduit 58 may be supplied to a nozzle 60 to blow the garbage, in batches, from the shelves or plates 27 of the vertical conveyor 26 into the inlet port 28 at the top of the furnace.

The burning of the garbage and the combustible trash produces the two byproducts that must be disposed of, first, the fumes, and second, the ash.

The fumes from the furnace are exhausted by entrainment in the airstream that enters inlet port 28, and then are directed through the aqueous solution 46, which is essentially a thin lime sludge. The obnoxious byproducts in the fumes are absorbed by the sludge and the relatively clean air of the stream is then permitted to bubble out through the sludge, for further treatment before being released back into the atmosphere, as explained below. At the same time, the ash that is produced from the burned garbage and trash is caught on the shaker screen 38 and sifted so that only relatively fine or powdery ash is sifted down into the collecting compartment 40, into a suitable container, for further treatment to be made with the addition of recognized additives into a useful commercial byproduct, as a fertilizer.

In order to put the ash in better condition for handling, it is permitted to accumulate in one or more boxes, as it sifts down through the sifting shaker screen 38. One such box 64 is indicated schematically in FIG. 1, positioned below the shaker screen 38 to receive the sifted ash that drops through the screen. In the subsequent process of treating the ash for use, some of the aqueous solution from the lime slurry, when saturated by the fumes, is taken from the bath 46 and dried, and then combined with the ash, and further mixed, with the addition of other appropriate ingredients, as may be desired.

Thus, by the treatment thus far described, collected garbage and combustible rubbish or trash are burned and essentially disposed of on a disposal truck unit in a manner that recovers the ingredients of the garbage and trash combustibles and converts those ingredients to a form suitable for reuse, without attracting rodents and bugs, and creating growth of injurious bacteria as an ordinary garbage dump would do. Those combustion byproducts which would be pollutants if permitted to escape into the atmosphere, are thus trapped and converted into a useable form which can be handled as a commercial article of commerce.

By treating the garbage and the rubbish in the manner herein described, the procedure is one that handles relatively small quantities continuously and is therefore free of controls and conditions that arise when large accumulations of garbage and rubbish are made at one location, when the burning operation is kept up continuously and without regard to safeguards against air pollution, while at the same time the very large accumulation of garbage and rubbish in such a dump conventionally would attract rodents and bugs, and would enable them to proliferate and harass the surrounding community.

While one part of the apparatus is operating on the garbage and combustible trash, the other part of the apparatus can be operating on the normally noncombustible items, such as glass bottles and tin cans.

The manner in which the operation is performed on the noncombustibles will be better understood upon reference to the components of the apparatus shown in the upper part of FIG. 2 and FIG. 3, which latter figure shows a schematic elevation.

As shown schematically in FIGS. 2 and 3, the left hand rear side of the disposal unit is provided with a chute 100 that leads to, and serves also as part of, a receptacle 101 for receiving noncombustibles, such as glass bottles and tin cans. Here again, a vertical conveyor 102 is provided to raise bottles and tin cans from a lower region, in the receptacle 101, to an elevated region at which gravity will deliver those items from conveyor 102 to a pair of crushing rolls 104, which serve to break the glass bottles and to partially flatten the tin cans.

The glass from the broken glass bottles falls into a bin 106 where the glass is accumulated for subsequent removal and washing, to be available as commercial cullet for sale to glass-making companies.

The tins, after passing through the crushing rolls 104, where they are partially flattened, move across an open grating 108 into and through a fire box 110, where they are subjected to flames from burners 112, to remove by burning, any labels, coating or food particles which may be adhered to the tin cans while being handled and treated.

The openwork grating 108 is such as to permit the glass to fall through into the bin 106, below, while guiding the partially flattened cans into the fire box 110, past a pendulously pivoted door 111, that normally closes the upper end of the firebox.

After passing through the firebox 110, the tins continue their forward movement by gravity onto a chain conveyor 114 by which the tins are directed downward into a baling area 116. When a predetermined weight of the tins is accumulated, a set of hydraulic rams 118A, 118B and 118C are actuated to compress the tins into a bale of approximately predetermined size and weight, which can be conveniently handled. The bale is then transferred into an adjoining storage space 120, until removal at the end of the operating interval of the unit.

The fumes generated in the firebox by the burning of any of the materials adhering to the tin cans, are treated and absorbed and collected as were the fumes generated in connection with the burning of the garbage. A suitable exhaust conduit 124 is connected from firebox 110 to the main exhaust conduit 42 shown in FIG. 1 and the exhaust blower 44 serves to pull a stream of air through the firebox 110, also, to entrain the fumes of the products of combustion in the firebox and to direct those fumes also into the alkaline sludge bath 46, for removal of the pollutants and release of the clean, normal air.

In the first modification of the system as disclosed herein, the two inputs have been kept separate. That is, the garbage and burnable trash have been introduced as one input to be fed directly to the furnace, after comminution, whereas the nonburnable items, such as the glass bottles and tin cans, are fed in as a separate input. From there, the glass bottles are broken and the glass collected for use as commercial cullet for glassmaking tanks, and the tin cans are delivered to a suitable area in which the cans are collected into batches of some predetermined weight and then compressed into bales small enough to be conveniently handled.

In the case of stationary apparatus, no excessive problem of space is involved in collecting tin cans. In the case of a mobile apparatus, however, a small, powerful press is provided in the collecting region of the tin cans, which serves to compress and bale the tin cans so they will take up relatively small space, which will permit the mobile apparatus to accumulate a substantial amount of rubbish before requiring a trip to a transferring station.

The second modification utilizes all of the components that have been described in connection with the first modification, the difference being in the sequence of operations and in the manner of feeding the garbage and rubbish into the apparatus.

The operation according to the second modification accepts all of the garbage and rubbish at one input station, so no preliminary separating operation is necessary to separate the garbage from the noncombustible materials, such as the glass bottles and the tin cans. By thus permitting all the rubbish to be thrown in to the one receiving unit as at chute 22 in FIG. 5, the operation of the apparatus is more flexible and not dependent upon prior separation of the rubbish into separate categories.

In this second type of operation, the shredder rolls 24, shown in FIG. 1, are replaced by coarse primary crushers 24a which will accept garbage and other combustible materials and will also serve to break the bottles and provide at least preliminary flattening of the tin cans.

In this second modification, everything as rubbish is then fed from the primary crusher rolls 24a to the vertical conveyor 26, and the rubbish is then raised to the elevated position to be dumped into the furnace 30 through the inlet port 28.

The details of the furnace shell structure are not entirely indicated, but include a steel metallic housing with internal fire brick and suitable external insulation on the furnace shell and on the related connected structures and piping or conduits to limit the heat transference and conductance to adjoining parts of the apparatus, and particularly to prevent or, at least limit, the transfer of heat to bearing surfaces for the various motive units that will be employed to operate transfer equipment, such as, for example, the conveyor, and rotating equipment, such as the rolls and motors for the air pressure and vacuum pumps. To the maximum extent possible, all of the motive equipment utilizing bearings will be located near the outer walls or doors of the main housing to receive the benefit of the cooling effect of ambient air; and connecting conduits and operating shafts will be appropriately located to transfer air or mechanical energy or the like from the motive devices to those parts that must necessarily be located closer to the furnace.

In the case of this second modification, all of the glass bottles introduced in the general batches of rubbish will generally be broken into pieces that can very readily be mixed in with the garbage and other combustible material that will go into the furnace.

The bottom of the furnace 30 is shown provided with a suitable grill work 34 with one pair or more of pivoted trap doors 36 underneath, which may be automatically opened by any standard means to permit the glass and tins to be discharged onto a vibrating screen 38.

The doors 36 may be normally in upper closing position, so that noncombustible materials, such as the glass and tin cans and other metal or noncombustible parts, will accumulate at the bottom of the furnace 30 while the garbage and other combustible material is being burned and the fumes drawn off, as previously explained, in the same manner as in the first modification.

In this operation of the second modification, the pivoted trap doors 36 at the bottom of the furnace may be periodically opened to permit accumulated noncombustibles, like the accumulated glass and tin cans, to fall through onto the screen 38, as previously described. The particles of ash that drop through from the furnace onto the screen 38 will be there sifted by the screen and fall into the container 64, as previously described. However, the mesh of the screen may be such as to prevent the usual glass pieces from falling through, and the vibrating screen 38 will transport those glass pieces and the tin cans on the screen 38 towards the other end of the screen, which in this case, dumps the glass pieces and the tin cans into the compartment 101, shown in FIG. 8, instead of merely transporting those items to the end of the screen and there accumulating them in a space from which they may be removed at the end of the day's operation, which was the method previously described when the apparatus was to be operated in accordance with the first modification.

In this second modification, the noncombustibles, such as the tin cans and glass, that are conveyed from the screen 38 into the compartment 101, are similarly raised by the inclined vertical conveyor 102, as was done in the first modification, except that now, the glass pieces and tin cans are supplied to the pressure rollers 104, which serve now mainly to separate the glass and the tin cans. The rolls further break up any larger pieces of glass from the bottles, with suitable intermeshing lugs on the two rolls, and serve also to preliminarily crush the tin cans passing through the rolls.

In order further to separate the broken glass from the tin cans, the openwork grill 108, previously described, has sufficiently large openings to permit the glass pieces to fall through, while providing a relatively planar openwork structure that serves as a transfer plate to permit the tin cans to slide across onto the equivalent belt conveyor 114, previously described, and then to slide down into the compartment 116, in which the cans may be compressed and baled.

All of the components of the apparatus are essentially the same for both modifications, as described. The flexibility of the system is such, however, that where the garbage is separated from the noncombustibles beforehand, the garbage and combustible materials may be fed directly into the furnace, and the noncombustibles may be supplied to that part of the equipment which can be used to separate the glass from the tin cans, en route to the compression or baling chamber 116 where the tin cans are baled.

The basic feature of the invention, in both modifications, is the procedure for treating the products of combustion, to remove them from the airstream as pollutants, and to recover them as mineral ingredients for use in the manufacture of fertilizers and soil nutrients. The burning of such garbage and trash without removing the products of combustion from the airstream, would be merely to fill the air with poisonous pollutants. Thus, the basic feature of the invention is to provide a self-cleansing disposal system, and for such system to provide a filter and a method of operating the filter that will remove the pollutants from the airstream through the furnace in such a way as to remove the obnoxious products of combustion, and actually to recover the ingredients of those products of combustion to make them available for reuse, as soil nutrients and reintroduction into the natural triangle of mineral, vegetable and animal elements.

Figure 9:
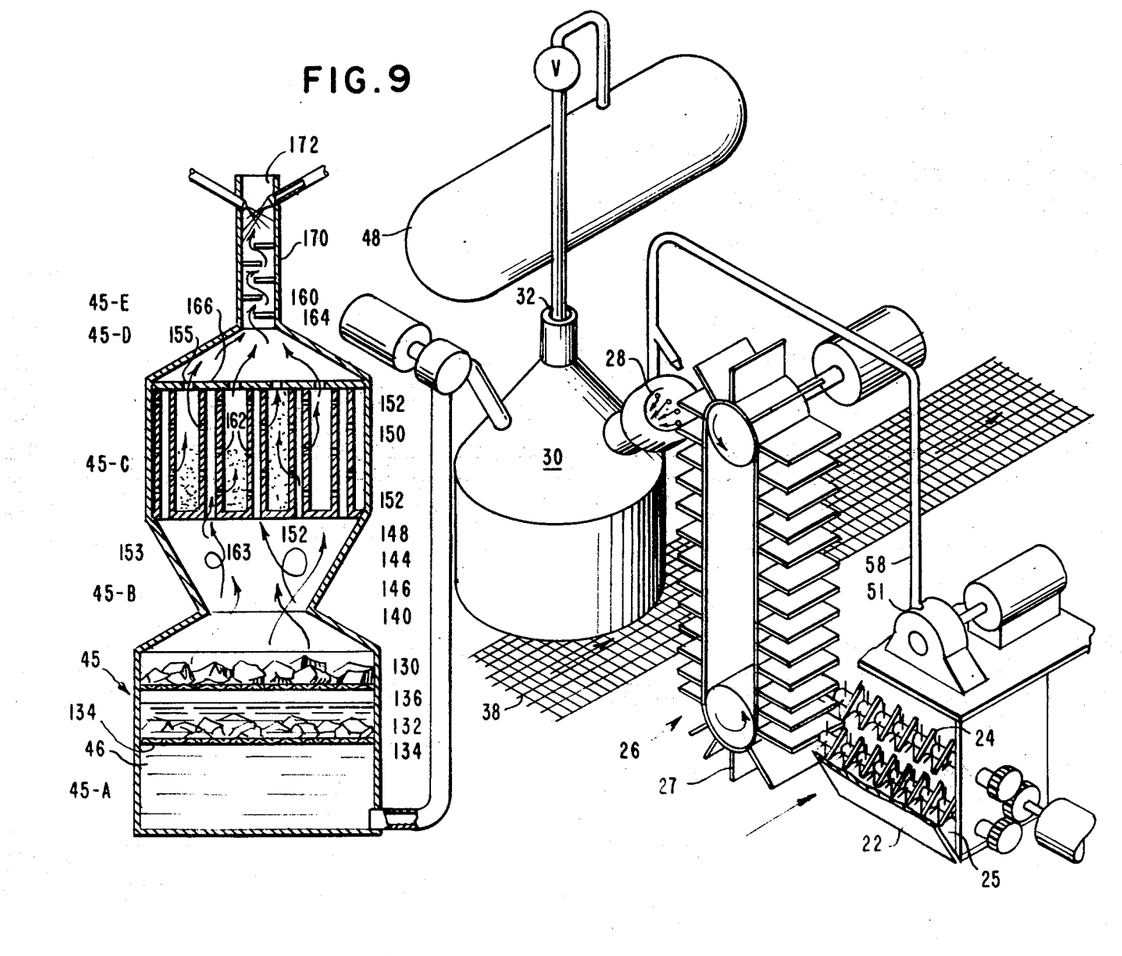
FIG. 9 is a schematic functional perspective of the elements of the system, to emphasize the details of the filter.

The arrangement of the elements shown in FIG. 1 are shown schematically arranged, in more detail in FIG. 9, in order to show the filter 46 enlarged and in more detail.

In FIG. 1 the filter 45 for cleansing the airstream and fumes from the furnace is illustrated as functioning through the use of a liquid bath primarily. As shown in more detail in FIG. 9, a filter 45 comprises a tank 45–A containing the bath solution 46, a Venturi neck 45–B, a fiber glass packed filter 45–C and an exit stack 45–D.

The bath solution 46 is made up of a sludge of phosphate rock and limestone with sufficient water to form a thin, runny sludge. Just under the top level of the sludge solution 46, a grill 132 is supported on brackets 134, in turn, to support a closely packed layer of rocks of chemical materials that would serve as soil feeders, or fertilizer, such as, for example, aluminum oxide, lime, phosphate rock, or the like. One function of these rocks is to act as bubble breakers. When the airstream, with the furnace fumes, is forced into the tank 45–A at the bottom, the airstream percolates up through the sludge as bubbles. The products of combustion entrained in the airstream are absorbed by the sludge and thus removed from the airstream, which then normally moves upward out of the sludge in bubble form. However, the films that enclose the air bubbles include some of the sludge material in liquid form, or some of the gases absorbed from the combustion byproducts. If these bubbles were permitted to continue out into the atmosphere, the bubbles would carry with them a great deal of combustion byproducts which it is desired to remove from the airstream and keep out of the atmosphere. By breaking such bubbles, the material of the film is returned to the sludge solution and the air that was enclosed in the bubble is permitted to proceed upward towards escape, but is nevertheless again mechanically scrubbed in its exiting movement. One scrubbing is accomplished on the rough surfaces of the rock 136 covering the entire top area above the grill 132.

Thus the function of the grill 132 and its top layer of rock 136 is first to break the bubbles to retrieve what liquid matter may be in the film enclosing each bubble, and, second, the function is to further scrub the released stream of air from the bubble to further retrieve any moisture content that is contained in even that small quantity of air with the bubble.

The airstream that percolates up through the first layer of rock 136 is additionally treated, to insure optimum and maximum removal of the fumous ingredients of the airstream.

The airstream may be directed to pass through more than one sludge bath in order to assure progressive elimination of the mineral ingredients in the airstream by absorption in those sludge baths. Various filtering arrangements may be utilized. For the purpose of the present arrangement, a second superposed layer 140, of phosphate rock, limestone, aluminum oxide and similar materials that have fertilizing ingredients, is provided to serve as a second cleansing layer to provide a labyrinthian path for the airstream to assure maximum contact between the airstream and the rock materials for the cleansing action. Any moisture content in the airstream after it has percolated through the first sludge bath will be adsorbed and absorbed by the second or upper layer 140 of rock material to further remove any moisture content of the airstream as it moves upward.

Moreover, any continuing smaller bubbles carried out of the sludge by the moving airstream will be engaged and scrubbed by the rocks on upper layer 140, to further retrieve any small quantities of materials contained in the films surrounding those smaller bubbles.

It should be noted that the airstream, as exhausted from the furnace, will be at an elevated temperature, generally above the boiling point of water, so that the stream feeding into the slush tank will have a sufficient content of moisture in it to assure the liquid condition of the slush. Moreover, the high temperature of the slush, and of the airstream and its constituents, will contribute to the chemical action between the fumous contents of the airstream and the material in the slush and in the rock layer at the top of the slush and in the additional upper rock layer in the air above the slush.

The conduit from the furnace to the slush tank, and the slush tank and the related elements of the filter are appropriately insulated to prevent undesirable dissipation of heat to the adjacent mechanism, but also, and primarily, to retain the heat to promote appropriate chemical reaction between the slush and cleansing rock on the one hand, and the ingredients of the airstream as it passes through, on the other hand.

After the airstream passes through the upper layer of rock 140, the airstream is directed through a Venturi neck 144, having a short compression chamber within a converging annular wall 146, and through an expansion chamber within a diverging annular wall 148, in order that the sequential compression and decompression of the moving airstream will provide a further mechanical distension and breakage of any air bubbles still entrained in the airstream.

For a final cleansing of the airstream before it is released to the atmosphere, a final shell filter is provided including a plurality of tubes 152 supported vertically in spaced relation between a floor plate 153 and a ceiling plate 155. The tubes 152 are open at their bottom ends 154 to communicate with holes 156 in the floor plate 153. The tubes 152 are closed at their upper ends 160 against the ceiling plate 155. Each tube has a large number of perforations 162 in the sidewalls, to permit the airstream entering through bottom entrance ports 154 to move through the perforations 162, and then through matted fibrous packing of fiber glass mats that are fully packed around the tubes 152 and profusely embedded with large quantities of carbon granules 163, to provide further mechanical scrubbing and cleansing action of the airstream, as it passes through the perforations 162 and through the fiber glass mats and proceeds to and through exit ports 164 in the ceiling plate 166 of the filter 150, through an exit stack 170 to the atmosphere.

The shell filter 150 may be periodically washed. For that purpose the shell filter 150 may be removed from the Venturi neck 45–B and a water stream suitably introduced through any of the top openings 164 in the ceiling plate 166 and the water stream permitted to flush out any unwanted materials entrapped in the fiber glass or in the carbon granules, by flowing through such filtering material and exiting out through the bottom holes of the tubes 152. That filter shell may then be subjected to a heating and drying operation to remove any undesired moisture accumulated in the fiber glass carbon packing.

This cleaning operation can be conveniently done at the end of each daily run of the operation.

Such cleaning and drying operation may also be done at the end of each daily run without disconnecting the fiber glass filter from the structure, since at that time it may also be desirable to remove any of the accumulated saturated slush from the bottom of the filter. Thus, the washing of the top filter unit may be part of the general operation for cleaning a filter at the end of a day's run.

At that time all of the sludge solution may be removed from the tank and suitably dried, to eliminate water and moisture content, and to reduce the sludge to cake form, so it may then be broken into small pieces to be commingled with the ash, and further reduced in size to provide a final powdered mixture that is to serve as and constitute the fertilizer and the soil nutrient. The material can then be packed in bags for convenient handling.

Although this last operation has been defined as being something that can be done at the end of the day's run, provision may be made on the mobile apparatus for drying plates which will accept and hold batches of the saturated, treated liquid sludge to form cakes which can then be added to the ash as collected and appropriately packaged for subsequent more convenient handling. Such drying plates for the sludge would conveniently receive their heating energy from suitable blowers fed from the gas supply used for the furnace.

The system shown in FIG. 1 and in more detail in FIG. 9, applies generally to both modifications. In FIGS. 2 and 3, the two functional sequences for the first modification are shown, where the combustibles are separated from the noncombustibles.

Figure 7:
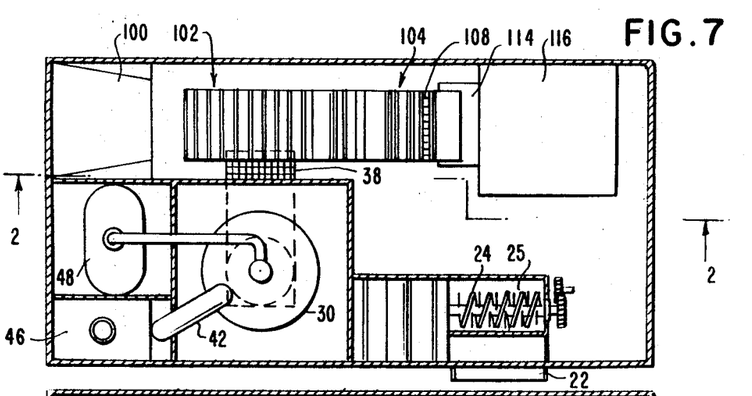
FIG. 7 is a schematic flow view, similar to FIG. 2, and showing the arrangement of the elements of a second modification of the invention, wherein all garbage and trash are fed into the furnace, from which noncombustibles glass bottles and tin cans are delivered by a bottom screen and conveyor to the crushing rolls and baling compressor.
Figure 8:
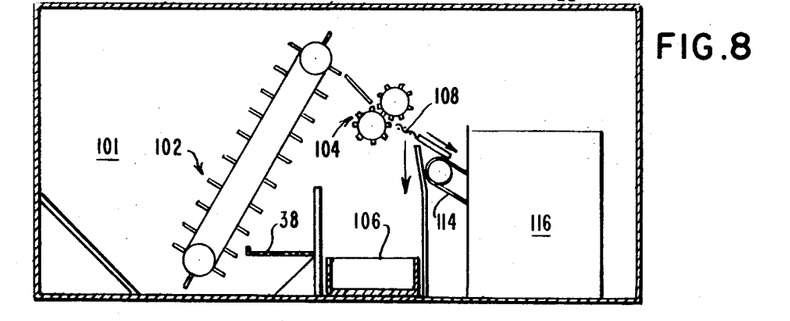
FIG. 8 is a schematic elevational view, similar to FIG. 3, and shows how the screen below the furnace brings the noncombustibles into the bin for the noncombustible conveyor.

In FIGS. 7 and 8, the two functional sequences are serially related, in the second modification, by feeding the glass and tins into the same furnace with the garbage in which the housekeeper mingles them. The mutual element is the screen 38, which transfers the noncombustibles, as dropped from the furnace, into the space 101, there to be lifted by conveyor 102 to the crushing rolls 104, for subsequent delivery to the baling area. This second modification also permits noncombustibles to be directly fed into bin 101 where previously separated by a householder. For that purpose, a door is provided on the rear panel, shown in FIG. 4. Another door is there made available for access to the compartment for the gas tank 48, shown also in FIGS. 1 and 2.

FIG. 5 shows the input chute 22, applicable to both modifications.

FIG. 6 shows the door 74 at the front panel for access to the front compartment 72 for storing baled tins from the baling press 118.

Figure 10:
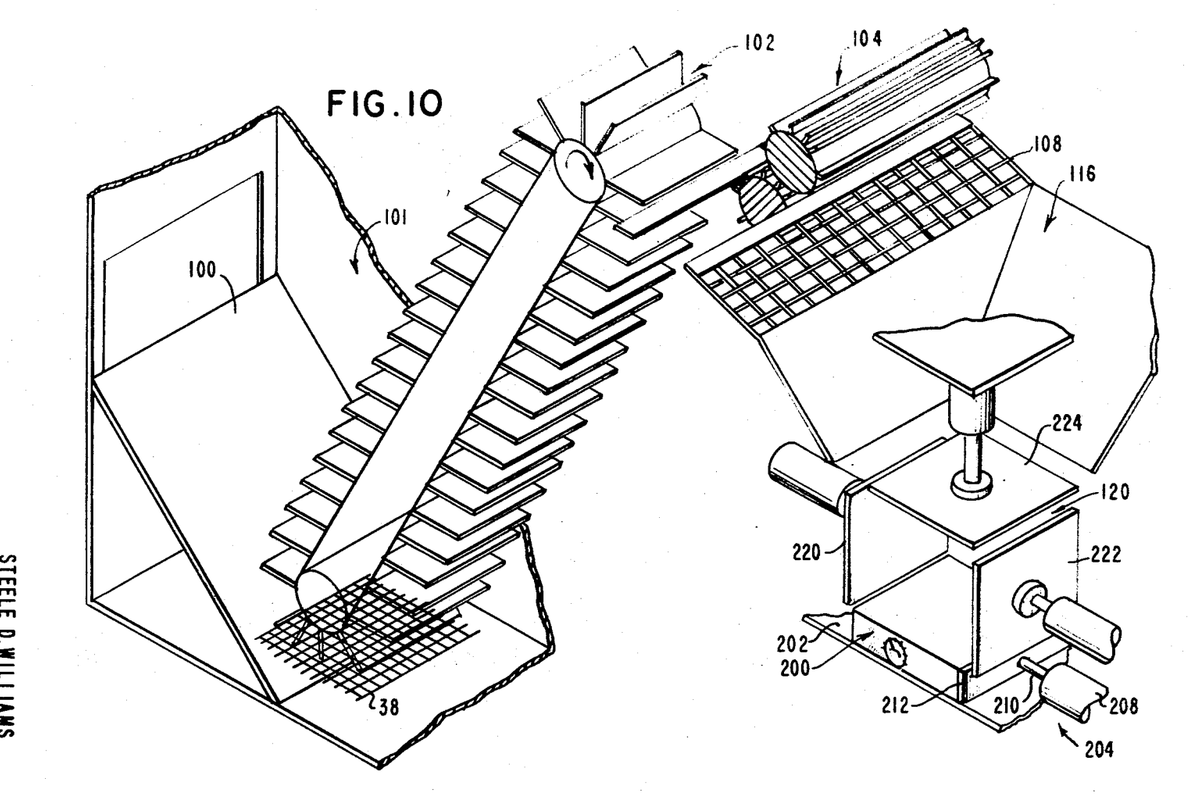
FIG. 10 is a schematic functional perspective of the elements of the glass and tin can handling components, to emphasize the arrangement for baling the cans.

FIGS. 9 and 10 show how the screen 38 carries noncombustibles from under the furnace 30 into the tin-dumping bin 101 for processing, and FIG. 10 shows the functional procedure into the baling press 118. As shown schematically in FIG. 10, the press 118 is shown as comprising a platform scale 200 resting on the floor 202 in the truck body compartment 204. The scale 200 is arranged to be kept normally in the position shown in the baling region 120, where it will receive and weigh an accumulating mass of tin cans, until a predetermined weight is accumulated, to be then compressed and baled. The platform scale 200 is then pulled out of normal weighing position, and out of the baling region during the operation of the press to bale the accumulated tin cans.

In order to provide for the operation of shifting the platform scale 20, an air piston 208 is provided to act on a connecting rod 210 suitably coupled to a guide plate frame 212 secured to the platform scale 200. After removal of the scale, the accumulated tin cans are compressed into a bale small enough to be conveniently handled. The pressure walls 220, 222 and 224 are shown merely schematically, and are shown with appropriate actuating rams to indicate the compression operation.

The baling press is shown here to illustrate the completeness of the system for treating and disposing of garbage and rubbish. The complete construction and details of operation of the press itself are described more fully in a separate application for patent.

As disclosed herein, the problem of disposing of garbage and trash, is handled by burning the garbage and trash, and entraining the products of combustion in a stream of air which is subjected to a cleansing operation, to remove and recover those products of combustion for use in making fertilizer and soil enrichers, and to thereby leave the airstream clean and avoid polluting the atmosphere.

The treatment of the glass and tins enables those materials to be restored to use in the technical applications, and avoids their loss to the commercial cycle, and also avoids the waste of space for junk yards for such materials, as would be necessary if not reclaimed.

The systems as shown may be variously modified, depending upon its application in stationary equipment, or in mobile equipment, without departing from the spirit and scope of the invention as described in the specification and drawings, and as set forth in the claims.

What is claimed is:

1. A trash and garbage disposal machine, comprising
a receptacle for receiving a batch of garbage;
a furnace having a pit and gas burning means for directing a flame of gas toward and into said pit, and said furnace having an inlet port for directing garbage into said pit and having an outlet port for exiting products of combustion;
means for receiving and shredding and comminuting sub-batches of said garbage;
means for transferring and introducing such shredded and comminuted garbage into said furnace through said inlet port;
a source of gaseous fuel for use in burning such garbage in said furnace;
means communicating with said source of gaseous fuel and connected to said gas-burning means for supplying fuel for a flame of said fuel to be directed onto such garbage in the furnace to burn said garbage;
and means for drawing off the gaseous products of combustion through said outlet port, from said furnace as generated by the burning garbage, and for filtering said products to remove certain air pollutants, said means including a filter bath of alkaline sludge; and air-moving means for drawing off the gaseous products of combustion from said furnace and for directing and forcing said gaseous products through said sludge bath.

2. A mobile trash and garbage disposal machine, as in claim 1, mounted on a truck body to be mobile, and enclosed within a boxlike housing having side and end walls and a top closure;
and a door in a wall of said housing, said door being movable to open or to closed position, and serving as an access door to permit garbage to be directed and delivered into said receptacle from outside the truck.

3. A trash and garbage machine, as in claim 1, comprising
an imperforate grate in the pit of said furnace;
means beneath said grate for receiving, collecting and holding residue ash from burned garbage;
screening means disposed beneath said ash collecting means to receive and sift such ash;
a compartment beneath said screening means;
means in said compartment for receiving and holding sifted ash from said screening means;
and means for vibrating said screen to aid in sifting said ash, and to move in combustible solids to a region at the end of said screen for manual or automatic removal.

4. A trash and garbage machine, as in claim 3, in which
said screening means includes means for vibrating said screen to sift ashes therethrough and to move incombustible solids to a region at the end of said screening means for removal.

5. A trash and garbage disposal machine, as in claim 1, in which said filter bath includes
a sludge bath of predominantly lime and alkaline ingredients;
a floating cover on said bath, said cover being shaped to contain a plurality of concave pockets in the upper surface thereof, with perforations in said pockets through said cover to provide exit passages for air bubbles percolating upward through and from said sludge and freed from gaseous byproducts absorbed by said sludge;
and weighing means of soil-enrichment and fertilizer material in rough rock form disposed in said pockets to hold said cover at least partially submerged to enable said cover to serve as a barrier against free bubbling exit movement of said airstream with entrained gaseous byproducts upward through and from said sludge, and serving thereby to hold such gaseous byproducts in temporary restraint to permit chemical reaction with and absorption by the sludge, and said fertilizer rock material serving by its rough surfaces to break any moisture bubbles entrained in said airstream, and serving thereby to return to said bath any material contained in the bubble films.

6. In the operation of burning refuse, of garbage and trash, the method of treating the products of combustion, to remove undesirable air pollutants therefrom, which method consists in burning said refuse in a confined region;
moving and controlling an airstream through said confined region to entrain the products of combustion, in place, as formed; and
passing said airstream with entrained products of combustion through an aqueous alkaline solution, to permit the products of combustion to be absorbed in said solution and the cleaned airstream carrier to bubble out to ambient atmosphere, said refuse is fed into said confined region in a relatively continuous train of small batches and in treating said batches of refuse to be substantially loosely infiltrated with air for optimum combustion.

7. The operation and method, as in claim 6, in which said refuse is first comminuted, as by shredding, to infiltrate each batch with air, before it is fed into said confined region to be burned.

8. In the operation of burning refuse, of garbage and trash, the method of treating the products of combustion, to remove undesirable air pollutants therefrom, which method consists in burning said refuse in a confined region;

moving and controlling an airstream through said confined region to entrain the products of combustion, in place, as formed; and passing said airstream with entrained products of combustion through an aqueous alkaline solution, to permit the products of combustion to be absorbed in said solution and the cleaned airstream carrier to bubble out to ambient atmosphere, said airstream, as it bubbles out through said aqueous alkaline solution, is caused to pass through a path between barrier rocks having sharp, rough discontinuous edges adequate to react on and break moisture bubbles entrained in said existing airstream, in order thereby to prevent the material held in the bubble films from moving out into the ambient atmosphere, and to cause such material from the bubble films to be absorbed in such barrier rocks, or to flow back into said aqueous solution.

9. The operation and method, as in claim 8, in which said airstream, after being cleared of said moisture bubbles by breaking of said bubbles, is further filtered before being permitted to enter the ambient atmosphere.

10. The operation and method, as in claim 9, in which said barrier rocks consist mainly of ingredients, or of chemical compounds of ingredients, having utility as soil nutrients.